(No Model.) 2 Sheets—Sheet 1.
J. E. WINDLE.
CLOTH MEASURING MACHINE.
No. 507,300. Patented Oct. 24, 1893.
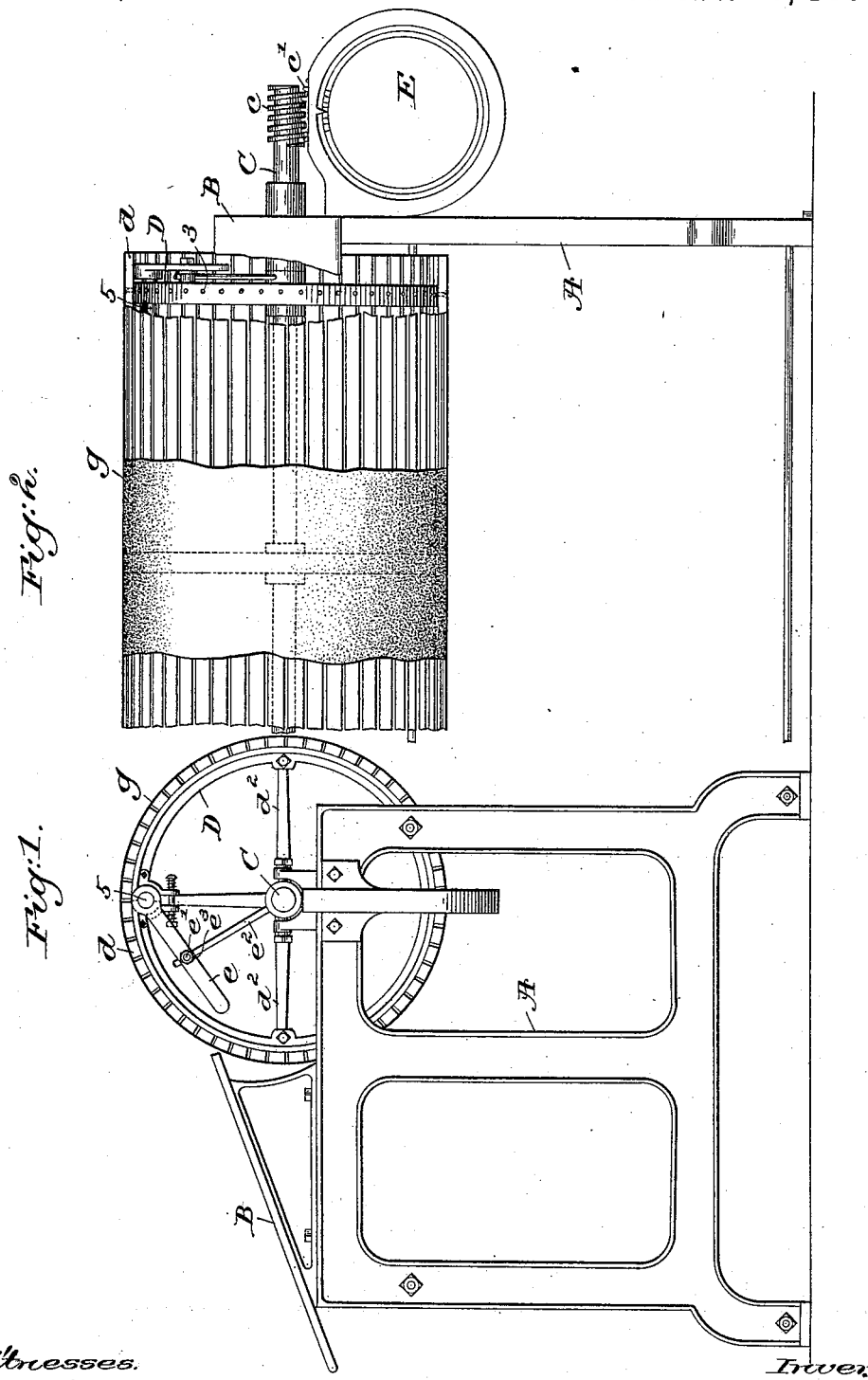
Witnesses.
Fred S. Greenleaf.
Louis N. Gowell
Inventor
John E. Windle,
by Crosby & Gregory
Attys (No Model.) 2 Sheets—Sheet 2.

J. E. WINDLE.
CLOTH MEASURING MACHINE.

No. 507,300. Patented Oct. 24, 1893.

Witnesses.
Fred S. Greenleaf
Louis N. Cowell

Inventor.
John E. Windle
by Crosby & Gregory
Attys.

UNITED STATES PATENT OFFICE.

JOHN E. WINDLE, OF WORCESTER, MASSACHUSETTS.

CLOTH-MEASURING MACHINE.

SPECIFICATION forming part of Letters Patent No. 507,300, dated October 24, 1893.

Application filed March 11, 1893. Serial No. 465,533. (No model.)

*To all whom it may concern:*

Be it known that I, JOHN E. WINDLE, of Worcester, county of Worcester, State of Massachusetts, have invented an Improvement in Cloth-Measuring Machines, of which the following description, in connection with the accompanying drawings, is a specification, like letters on the drawings representing like parts.
Cloth is now measured by contact with a rotating cylinder, which latter draws the cloth at the surface speed of the cylinder, each rotation of the cylinder being recorded.

Goods to be measured vary very much as to the quality of elasticity, that is, some goods stretch much more than others when being fed by contact with the measuring cylinder, and some goods stretch so much that accurate measurement cannot be made by the usual cylinder.

In my experiments to improve cloth measuring machines employing a cylinder, and thereby overcome the trouble of inaccurate measurement, I have discovered that all fabrics may be accurately and satisfactorily measured provided the measuring cylinder is adapted to be varied as to its circumferential length, as thereby it is possible to compensate by increase or decrease of such length for the extra stretch of the cloth, the cylinder being expanded in proportion to the stretch of the fabric of the cloth.

Figure 3:
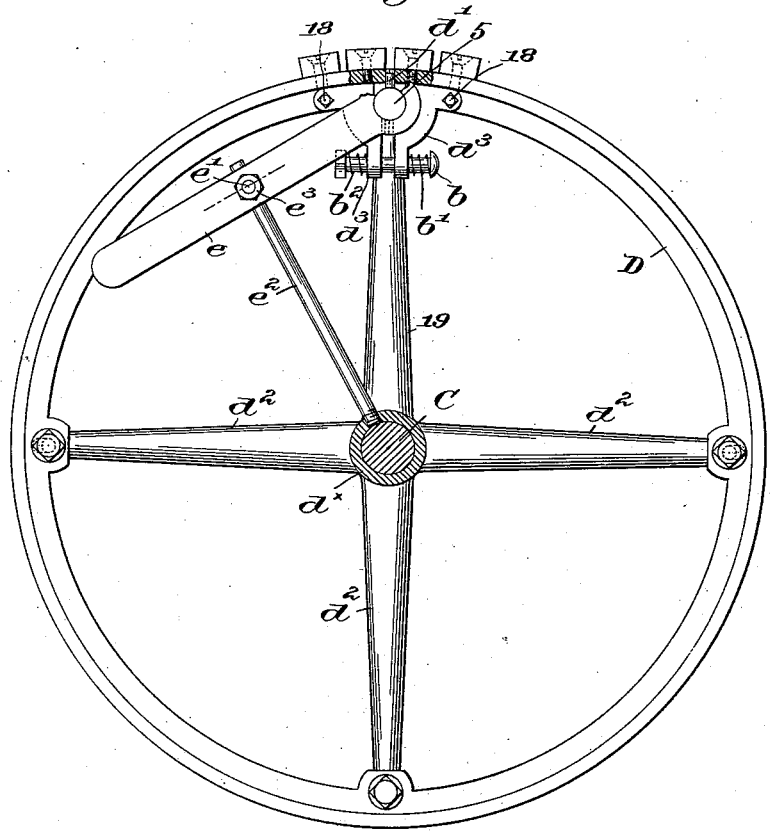

Figure 1, in side elevation, represents part of a cloth measuring machine embodying my invention. Fig. 2 is a left-hand view of the machine shown in Fig. 1, the board B being mostly broken away. Fig. 3 is an enlarged detail of one of the spiders and one form of expanding device for the cylinder; and Figs. 4 and 5 are details to be referred to.

The frame A and the inclined board B from which the cloth going to the cylinder is taken, are and may be all as usual. The frame has suitable bearings for the reception of the shaft C of the measuring cylinder, said cylinder being composed of a series of expansible spiders and a series of bars or lags $d$ attached thereto by suitable screws 2, one of said screws being shown in dotted lines Fig. 2. The spiders are composed each of a metallic ring D split or separated as at D' and connected by spokes $d^2$ with a hub $d^\times$ which is secured in suitable manner to the shaft C, the ends of the rings having heels $d^3$ attached to or forming a part of them, said heels, as represented in the drawings, being separate pieces attached by screws 18, the lower ends of the heels being normally drawn toward each other by a contracting device, herein represented as composed of a bolt $b$ extended through them and provided with two springs $b'$, $b^2$, each spring acting against a heel. Each hub $d^\times$ has a spoke 19 having a suitable bearing for a shaft 5, said shaft having mounted upon it at suitable intervals pins or projections $d'$, said shaft and pins or projections constituting an expanding device, and being located one end of the pin in the slot between the ends of the ring D referred to, the other end of the pin, represented by dotted lines in Fig. 3, resting between the heels $d^3$. The partial rotation of the expanding device causes the pins or projections thereof to act one against one end of the ring, and the other against the heel connected to the other end of the ring, thus expanding the ring, so that the circumference of the cylinder, composed of the lags or rings, is thereby enlarged more or less, that depending upon the extent to which the rod 5 is rocked or turned. As a means for turning the expanding device, I have applied to the rod a handle $e$ having extended through it a bolt $e'$, shown detached in Fig. 5, said bolt having a head provided with a hole to receive the rod $e^2$, the bolt receiving upon it in turn a nut $e^3$. The hole in the bolt is somewhat elongated, so that it is larger than the rod $e^2$, and consequently as the nut $e^3$ is turned upon the bolt, the bolt is made to clamp the rod $e^2$ firmly between itself and the side of the handle $e$, the said bolt and nut constituting a locking device to hold the expanding device in its adjusted position according to the class of cloth being measured in the machine.

Figure 4:
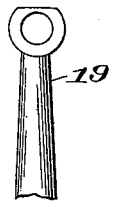
Figure 5:
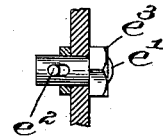

Fig. 4 shows the upper end of the spoke 19 with its bearing for the rod 5.

The shaft C has at one end a worm $c$, which engages and rotates a worm wheel $c'$ forming part of a suitable counter F, which latter may be of any usual construction, and inasmuch as there is nothing peculiar about the counter, I have not deemed it necessary to herein fully show or describe it. I may employ in this connection any counter ordinarily used in cloth measuring machines.

In practice, the bars or lags $d$ making up the exterior of the measuring cylinder will be covered with sand or emery-coated paper or cloth $g$, shown in Figs. 1 and 2, such rough surface enabling the cylinder to positively engage the cloth and carry it with it at the surface speed of the cylinder.

This invention is not limited to the exact construction shown of the cylinder, nor to its expanding device, as the same may be varied without departing from my invention.

Having described my invention, what I claim as new, and desire to secure by Letters Patent, is—

1. In a cloth measuring machine, a rotating shaft, and a cylinder having the rings of its spiders or heads split, combined with an expanding device for said rings or heads whereby the effective length of the circumference of the cylinder may be varied to compensate for the elasticity of the cloth being measured, substantially as described.

2. A rotating shaft having a series of spiders thereon, each having a ring split from one to its other edge to thus form ends, combined with an expanding device, a portion of which is located between the opposite ends of each ring, and devices to move said expanding device and confine it in its adjusted position, to operate, substantially as described.

In testimony whereof I have signed my name to this specification in the presence of two subscribing witnesses.

JOHN E. WINDLE.

Witnesses:
GEO. W. GREGORY,
JOHN C. EDWARDS.